US006086314A

United States Patent [19]

Savaria

[11] Patent Number: 6,086,314

[45] Date of Patent: Jul. 11, 2000

[54] FOLDABLE PLATFORM WHEELCHAIR LIFT

[75] Inventor: Pierre Savaria, St. Eustache, Canada

[73] Assignee: Ricon Corporation, Panorama City, Calif.

[21] Appl. No.: 08/912,279

[22] Filed: Aug. 15, 1997

[51] Int. Cl.[7] .......... B60P 1/44

[52] U.S. Cl. .......... 414/546; 414/917; 414/921

[58] Field of Search .......... 414/540, 545, 414/546, 556, 558, 917, 921

[56] References Cited

U.S. PATENT DOCUMENTS

| | | | |
|---|---|---|---|
| 4,138,023 | 2/1979 | Rohrs et al. | 414/546 |
| 4,140,230 | 2/1979 | Pearson . | |
| 4,270,630 | 6/1981 | Karkau | 414/545 X |
| 4,408,948 | 10/1983 | Robinson | 414/545 |
| 4,534,450 | 8/1985 | Savaria | 414/921 |
| 5,261,779 | 11/1993 | Goodrich | 414/546 |
| 5,401,135 | 3/1995 | Stoen et al. | 414/546 |
| 5,433,581 | 7/1995 | Farsai | 414/546 |
| 5,564,884 | 10/1996 | Farsai | 414/540 |
| 5,672,041 | 9/1997 | Ringdahl et al. | 414/921 X |

*Primary Examiner*—James W. Keenan
*Attorney, Agent, or Firm*—Thomas I. Rozsa; Tony D. Chen; Jerry Fong

[57] ABSTRACT

A wheelchair lift for use in conjunction with a vehicle having a door opening and a floor. The wheelchair lift includes a foldable platform assembly having two platform plates hingeably connected along their adjacent edges which are automatically foldable and stowed at one side of the vehicle door opening.

16 Claims, 12 Drawing Sheets

FIG. 11
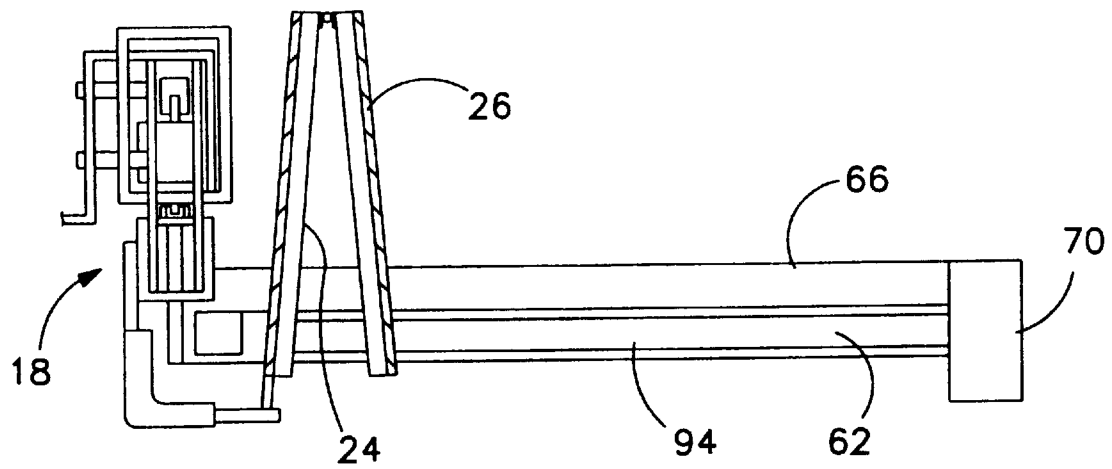
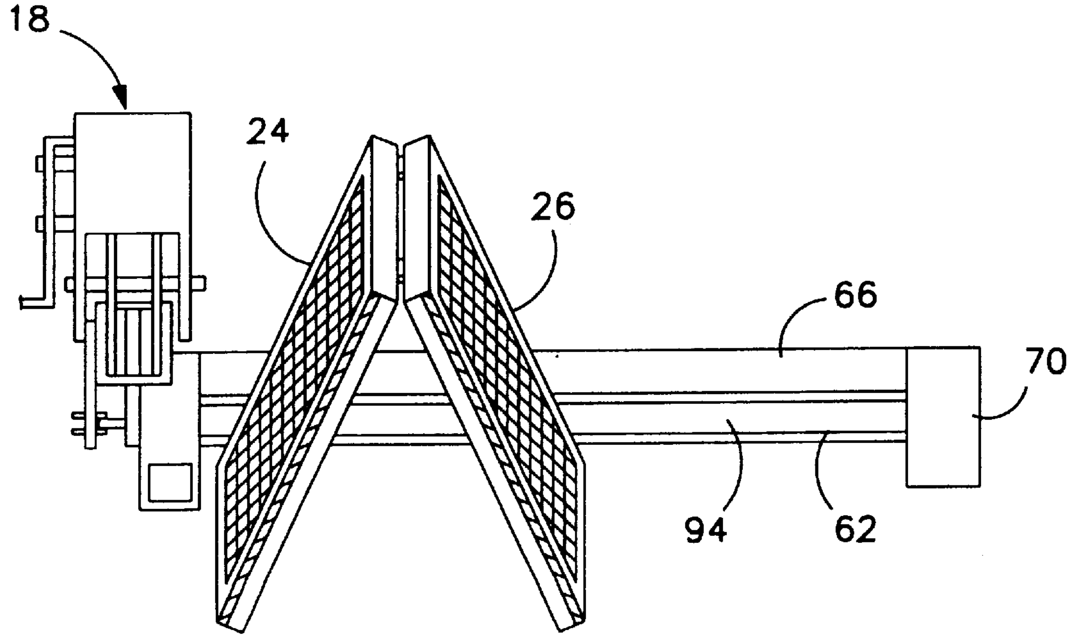
FIG. 12

FOLDABLE PLATFORM WHEELCHAIR LIFT

BACKGROUND OF THE INVENTION

1. Field of the Invention

The present invention generally relates to the field of vehicular wheelchair lifts for persons who are physically challenged or otherwise have limited mobility. More particularly, the present invention relates to the field of hydraulic powered wheelchair lifts with automatically foldable platforms.

2. Description of the Prior Art

Vehicular wheelchair lifts are widely utilized to assist persons in wheelchairs to get in and out of vehicles. These lifts typically have a mobile platform for transporting an occupied wheelchair, where the platform can be raised and lowered between a loading position at the ground level outside a vehicle and an entry position at the floor level inside the vehicle. When not in use, the platform can be stored inside the vehicle.

U.S. Pat. No. 4,140,230 issued to Pearson on Feb. 20, 1979 discloses a powered loading platform. The platform is pivotally supported by a support means which is in turn carried by a powered parallelogram linkage. The parallelogram linkage is driven by an electric motor through a gear system. The platform is formed by two grates which are hingeably connected so that one grate can be folded over and stacked on the other grate for storage purposes. One disadvantage of this platform is that it is powered by an electrical motor which is severely limited by the vehicle's electrical power source. Another disadvantage of this platform is that the folding and stowing of the platform each require a separate manual operation.

U.S. Pat. No. 5,401,135 issued to Stoen et al. on Mar. 28, 1995 discloses a foldable platform wheelchair lift with safety barrier. The wheelchair lift in general includes a main frame and a support frame which is pivotally connected to the main frame. The support frame supports a platform and can be moved through a parallelogram linkage. The platform consists of two half-sections which can be folded when not in use. The lift utilizes a barrier mechanism which functions as a safety stop for preventing the wheelchair from inadvertently rolling off of the platform. The lift further utilizes a latching mechanism for coupling the folded platform when it is in the stowed condition. Again, one of the disadvantages of this lift is that the folding and stowing of the platform still each require a separate manual operation.

U.S. Pat. No. 4,534,450 issued on Aug. 13, 1985 to Savaria (hereafter referred to as "the '450 Patent"), who is also the inventor of the present invention, discloses a vehicular wheelchair lift with a powered platform. The platform is supported by a support frame which can be raised or lowered by a hydraulically powered parallelogram linkage. The platform consists of two independent half-sections displaceable between a coplanar position and a transverse position. When the platform is pivoting to an upstanding position, the two independent half-sections are also caused to pivot from their coplanar position to the transverse position through respective tie-rod assemblies. This feature eliminates the separate manual operation for folding and stowing the platform. When the wheelchair lift is in its stored condition, the two independent half-sections of the platform rest in an upright orientation on the two opposite sides of a vehicle door and are cleared out of the passageway of the vehicle door.

While the wheelchair lift disclosed in the '450 Patent provides certain advantages such as a powerful single hydraulic pump as the power source and the automatic folding of the split platform, it is desirable to further design and develop a wheelchair lift which has a compact stowing profile and folds only on one side of the vehicle door, which leaves more room inside the vehicle and is also more suitable for smaller vehicles with narrower doors. It is also desirable to provide a vehicular wheelchair lift which has a simplified construction but is strong, safe, reliable, durable and cost effective, and still possess the advantageous features such as the single hydraulic power source and automatic folding and stowing of the platform.

SUMMARY OF THE INVENTION

The present invention is a hydraulic powered vehicular wheelchair lift with an automatic single-side-folding platform for persons who are physically challenged or otherwise have limited mobility.

It is an object of the present invention to provide a vehicular wheelchair lift which is fully automatic in both raising/lowering and folding/unfolding the platform.

It is also an object of the present invention to provide a vehicular wheelchair lift with a single hydraulic power source for driving both the raising/lowering motion and the folding/unfolding motion of the platform.

It is another object of the present invention to provide a vehicular wheelchair lift with a platform which can be folded to one side of the vehicle door when not in use.

Described generally, the present invention is a wheelchair lift for use in conjunction with a vehicle having a door opening and a floor. The wheelchair lift includes a mounting assembly mounted on the vehicle floor adjacent to the vehicle door opening. It is powered by a hydraulic actuating system which has a single hydraulic cylinder and is contained within a housing which is attached to the mounting assembly. The lift also has a foldable platform assembly rotatably connected to the mounting assembly and including two platform plates hingeably connected along their adjacent edges and further pivotally mounted to a platform frame member along a proximal edge of one of the two plates which is closer to the housing of the hydraulic actuating system. A linking assembly is utilized to connect the hydraulic actuating system and the platform for automatically moving and rotating the platform assembly from a stow position inside the vehicle to an entry level position at the vehicle door opening and inversely (i.e., from the entry level position to the stow position), and moving the platform assembly between the entry level position and a ground level position outside the vehicle and inversely (i.e. from the ground level position to the entry level position). The lift further has means for facilitating the unfolding of the platform assembly as the platform assembly is moving from the stow position to the entry level position, and also the folding of the platform assembly as the platform assembly is moving from the entry level position to the stow position. With this arrangement, the platform assembly can be automatically unfolded and deployed at the entry level position, and further moved to the ground level position in the unfolded condition and inversely, and automatically folded and stowed at the stow position at one side of the vehicle door opening.

The present invention wheelchair lift has many advantageous features. One advantage of the present invention wheelchair lift is that it provides full automatic control and operation of all motions of the wheelchair lift, including raising, lowering, folding and unfolding of the platform. Another advantage of the present invention wheelchair lift is that it utilizes hydraulic power which is powerful and provides a power up/gravity down hydraulic operation. A further advantage of the present invention wheelchair lift is that the single-side-folding stowing of the platform not only clears the doorway of the vehicle but also allows full reclining of the front passenger seat of the vehicle.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 11 is a partial top view of the lift with the platform in the folded position;

FIG. 12 is a partial top view of the lift with the platform in an unfolded position;

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
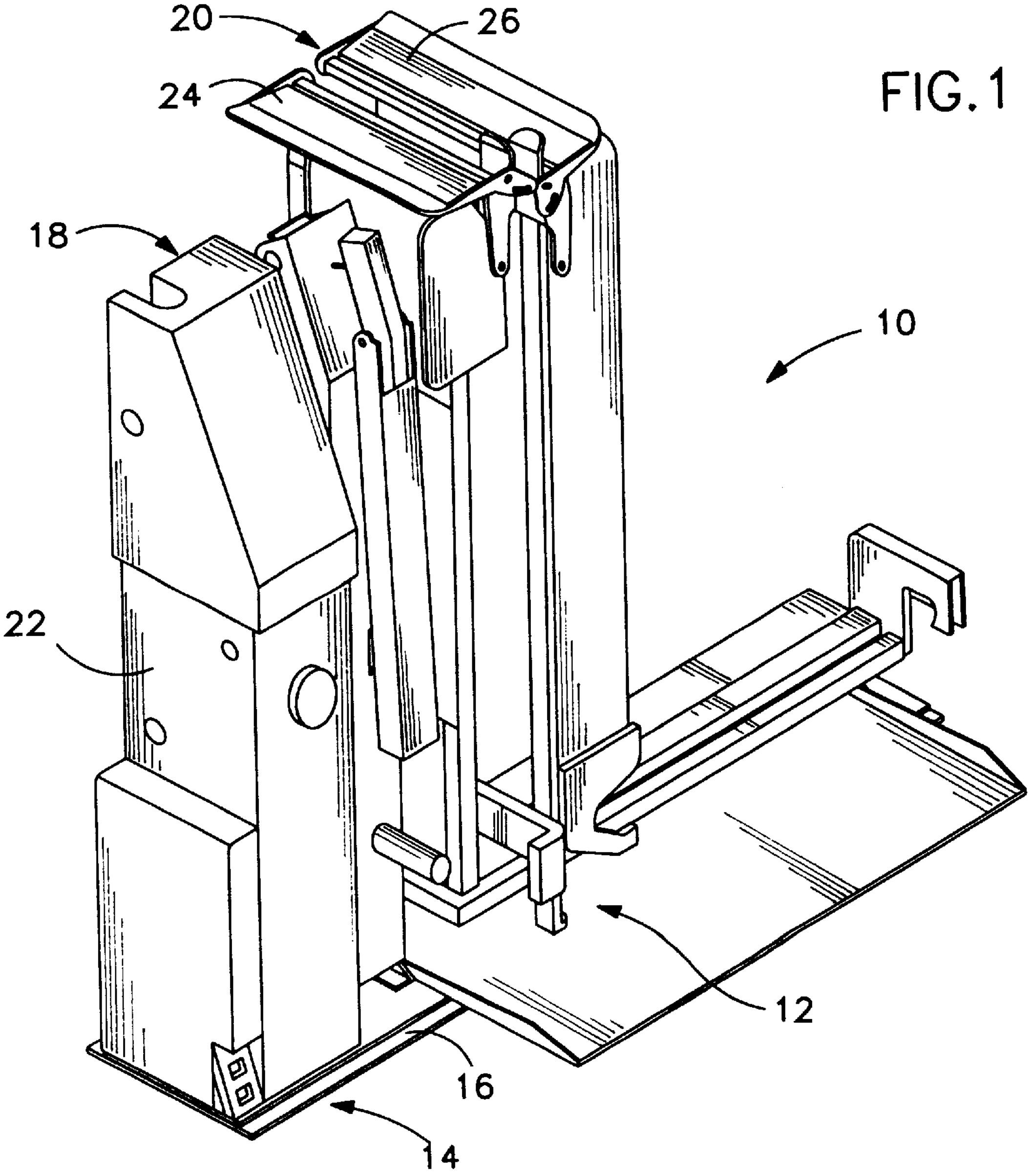
FIG. 1 is a front isometric view of the foldable platform lift when it is in a stowed position.

Referring to FIG. 1, shown at 10 is one of the preferred embodiments of the present invention powered wheelchair lift in its stowed position where its platform structure 12 is fully folded and stowed. The lift 10 is installed inside a vehicle (not shown) near an opening such as a side door of the vehicle. The lift 10 is firmly secured on the doorway of the vehicle by a mounting assembly 14 which mainly includes a base plate 16 that is mounted on the vehicle floor.

A hydraulic actuating system 18 is located at the same side of the folded platform assembly 20. The hydraulic actuating system 18 includes a mounting tower 22 which is fixed on the base plate 16, a hydraulic pump (not shown) and an actuating mechanism which will be discussed in detail later.

The platform structure 12 of the present invention wheelchair lift includes a foldable platform assembly 20 with two interconnected plates 24 and 26 and a moving linking mechanism 30 which is connected between the actuating mechanism and the platform assembly 20. In the stowed position, the two plates 24 and 26 are collapsed towards the inner side of the vehicle and folded against each other to the same side of the doorway, and oriented in a vertical position relative to the vehicle doorway.

Figure 2:
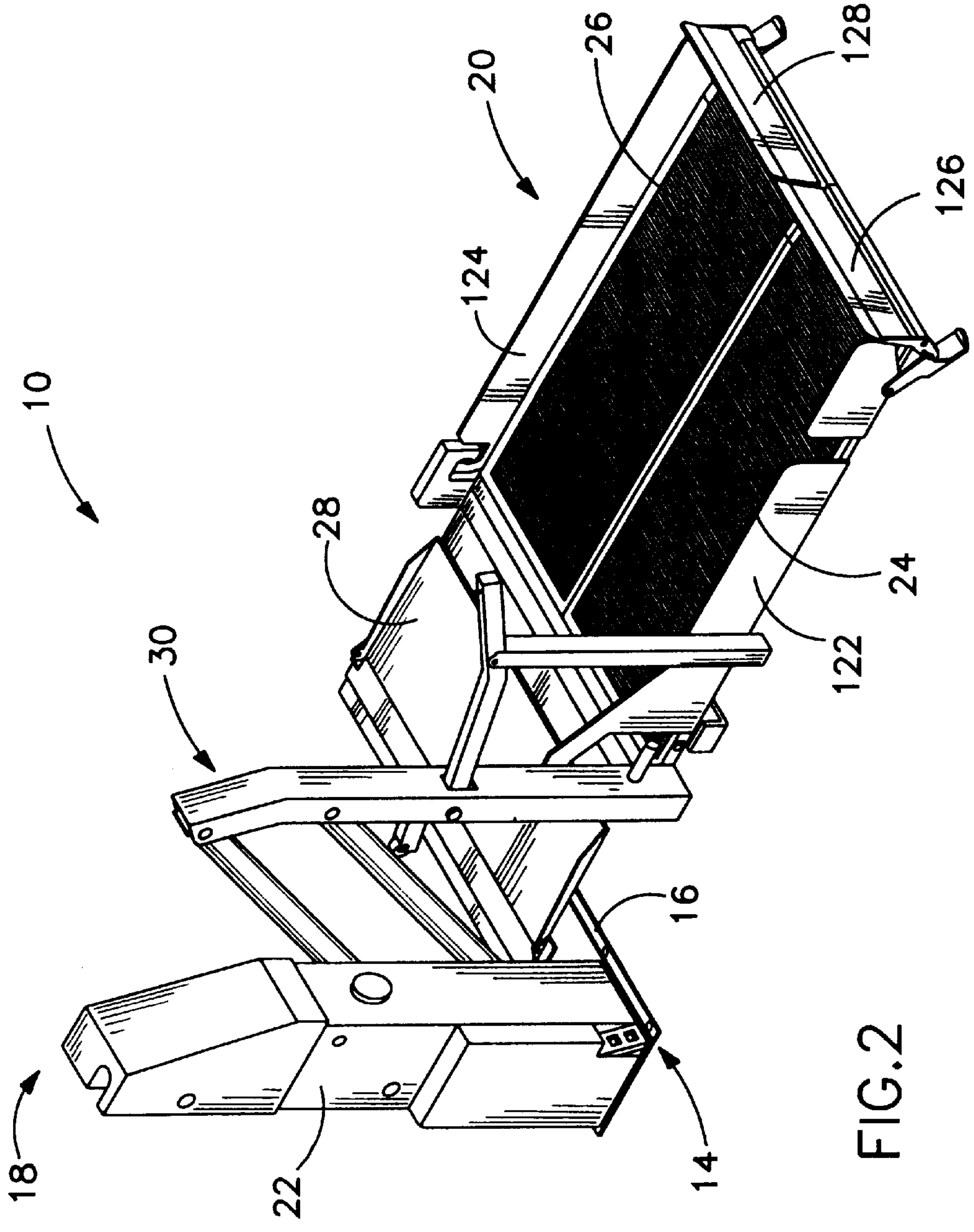
FIG. 2 is a front isometric view of the foldable platform lift when it is in an entry position.

Referring to FIG. 2, there is shown the present invention wheelchair lift 10 deployed at an entry level (which is flush with the vehicle floor), allowing the user in a wheelchair to roll off from the vehicle onto the platform 20 of the lift 10. At this position the platform 20 is unfolded such that the two plates 24 and 26 are in fully coplanar alignment to each other. A bridge plate 28 is pivotally mounted on the base plate 16 extending to the front of the lift 10 for bridging the gap space between the vehicle floor and the platform 20 at the entry level.

Figure 3:
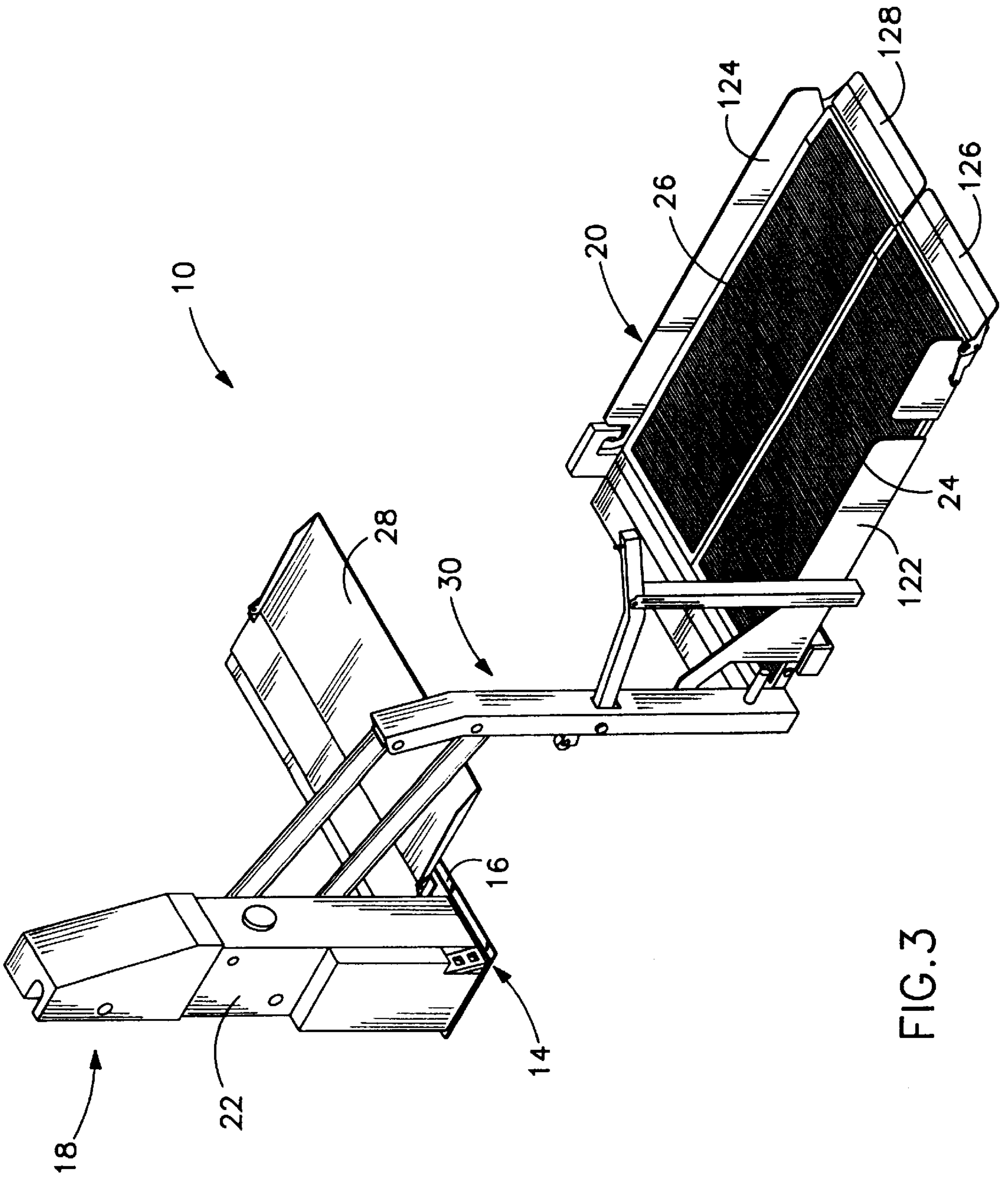
FIG. 3 is a front isometric view of the foldable platform lift when it is in a ground position.

Referring to FIG. 3, it shows that the lift 10 is lowered to a ground level (landing level) which allows the user in the wheelchair to roll off the platform to the ground level (outside of the vehicle).

Figure 4:
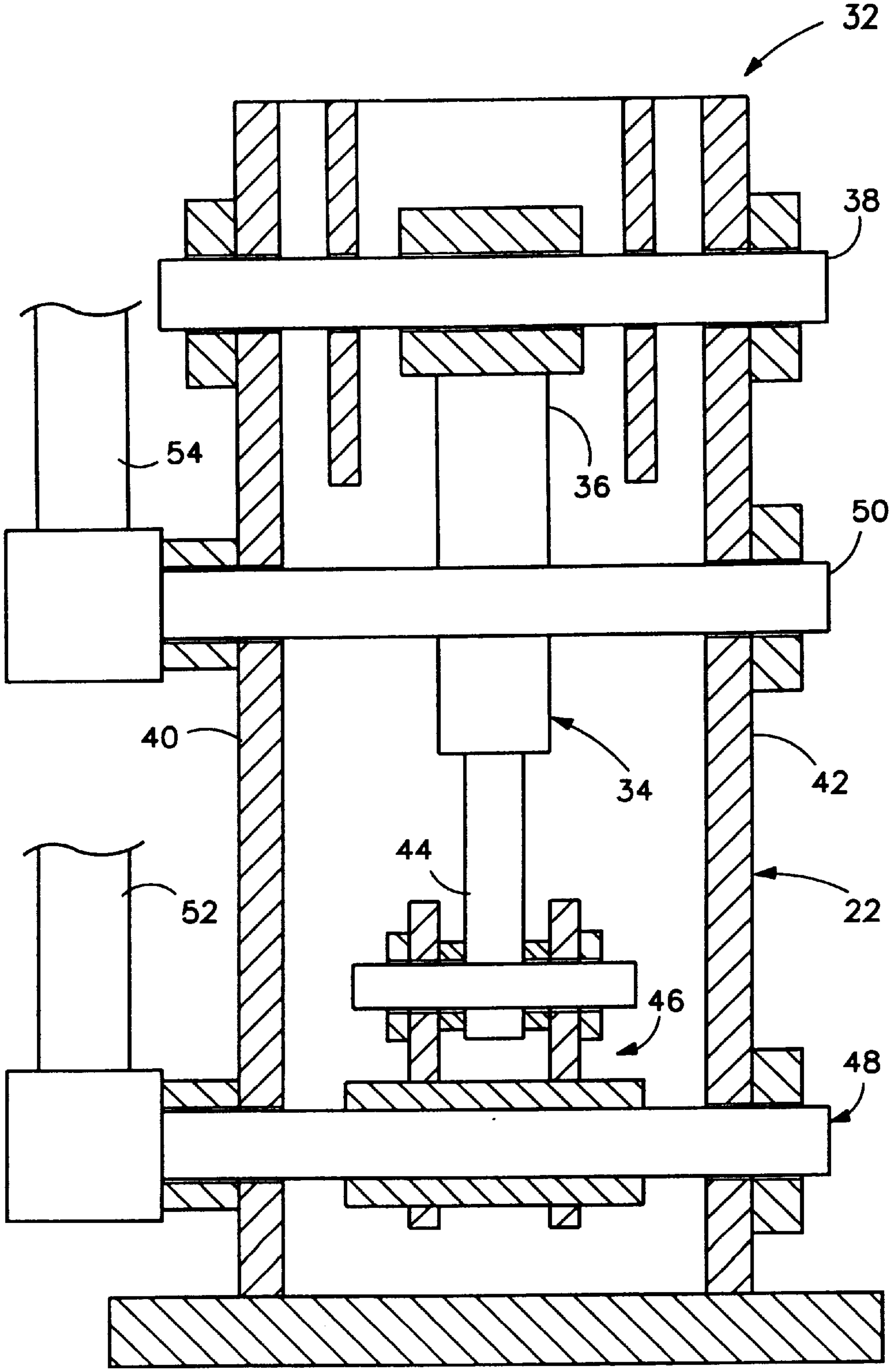
FIG. 4 is a rear partial sectional view of a driving mechanism of the lift.

Referring to FIG. 4, there is shown the actuating or driving mechanism 32 of the present invention wheel chair lift 10. The actuating mechanism includes a hydraulic cylinder 34 which is located inside the mounting tower 22. The cylinder end 36 of the hydraulic cylinder 34 is pivotally mounted to a mounting shaft 38. The piston end 44 of the hydraulic cylinder 34 is connected to a bracket assembly 46 which is in turn connected to a lower actuating shaft 48, so that the movement of the hydraulic cylinder 34 causes the lower actuating shaft 48 to rotate.

Figure 5:
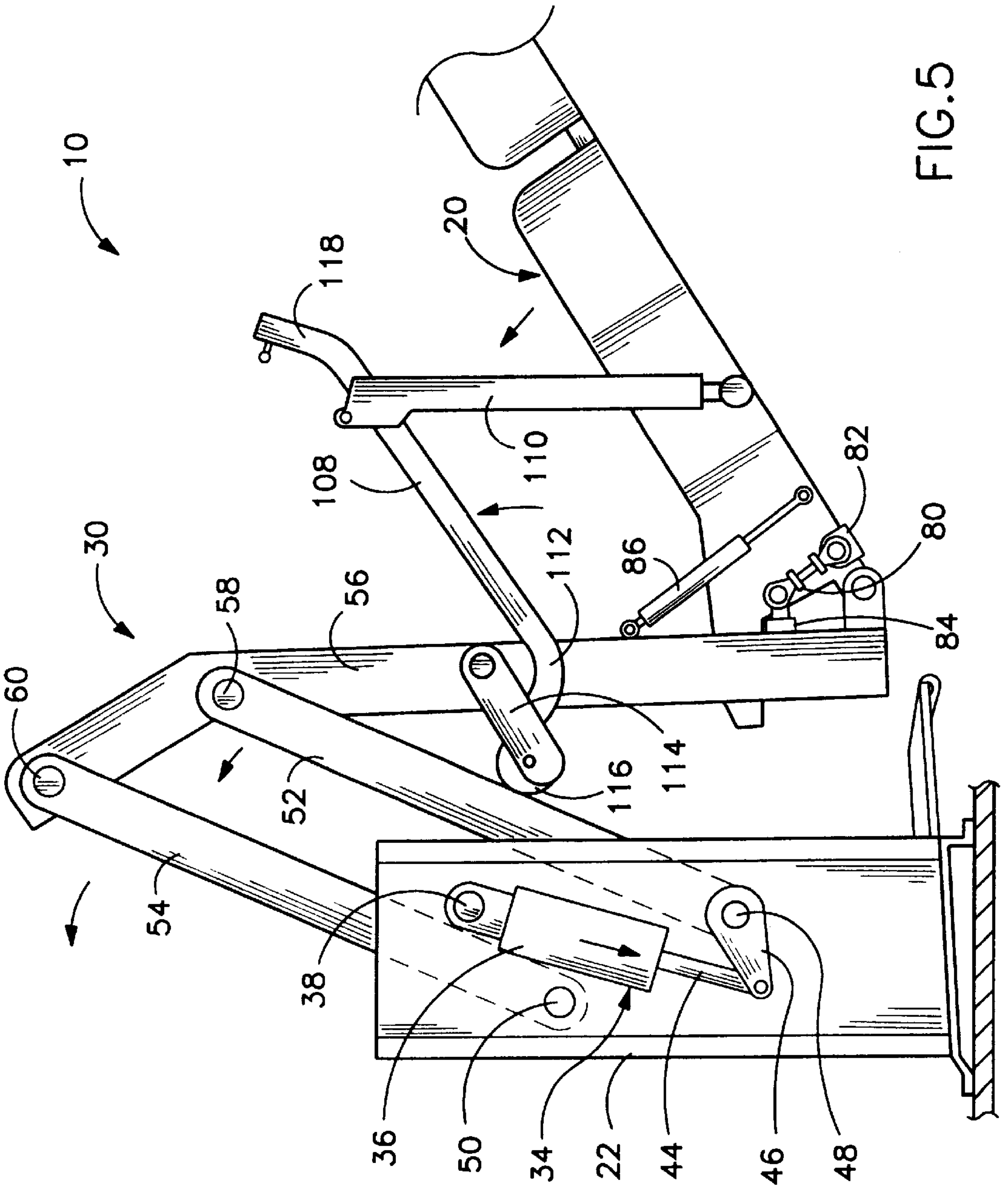
FIG. 5 is a side view of the lift with a partial cross view of a vertical arm and a partial cutaway of a platform, showing the lift in a motion between the entry and the stow positions.
Figure 6:
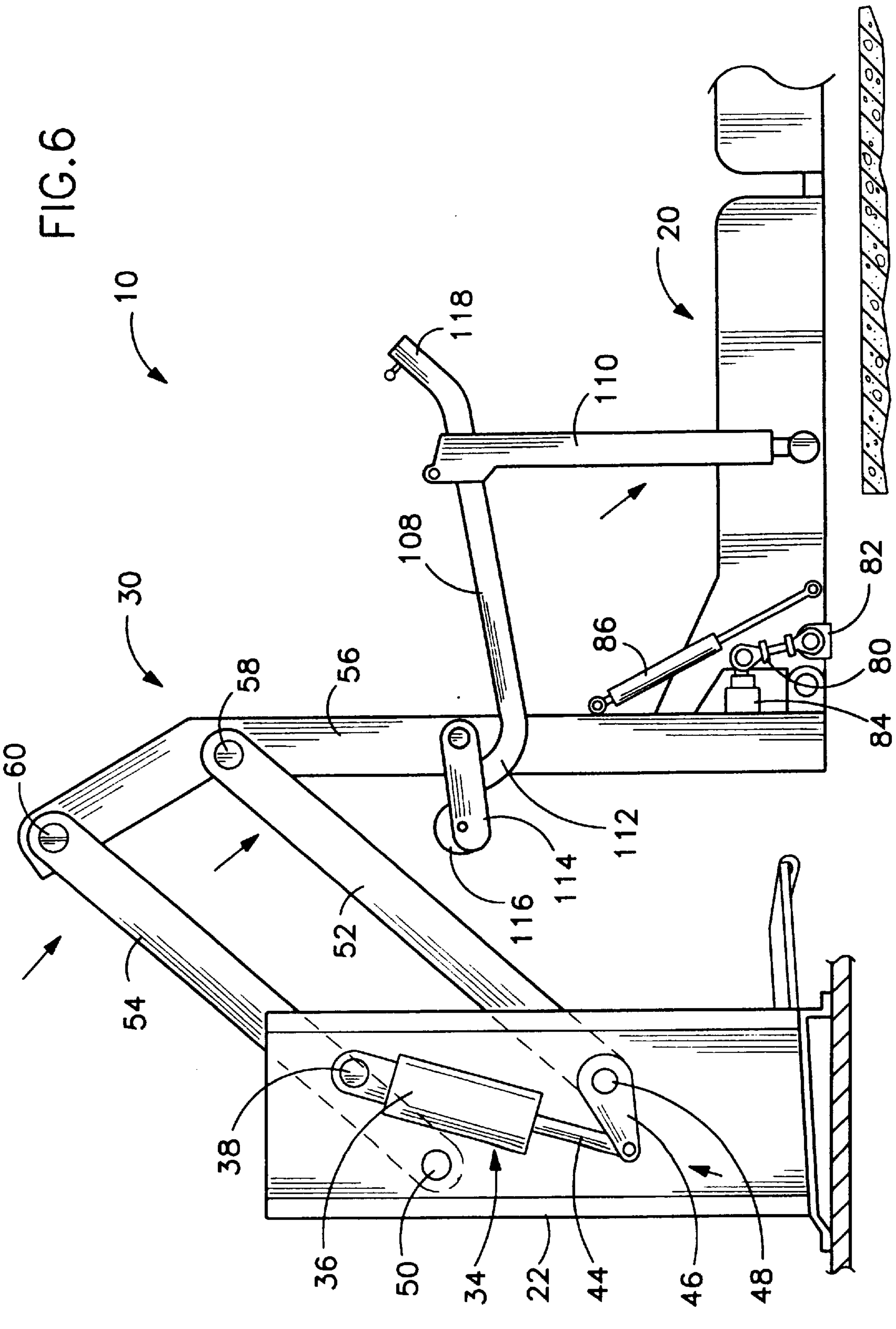
FIG. 6 is a side view of the lift with a partial cross view of a vertical arm and a partial cutaway view of a platform, showing the lift near the entry position.

Referring to FIGS. 4, 5 and 6, there is shown the moving linking mechanism 30 which is connected between the actuating mechanism and the platform assembly 20. The moving linking mechanism 30 includes a lower actuating arm 52. The lower end of the lower actuating arm 52 is securely connected to the lower actuating shaft 48 so that the rotation of the lower actuating shaft 48 drives the lower actuating arm 52 to rotate as well. The moving linking mechanism 30 also includes an upper actuating arm 54. The lower end of the upper actuating arm 54 is pivotally mounted to an upper actuating shaft 50. The mounting shaft 38, the upper actuating shaft 50 and the lower actuating shaft 48 are parallel to one another and are all horizontally supported between the two sidewalls 40 and 42 of the mounting tower 22. The upper ends of the lower actuating arm 52 and the upper actuating arm 54 are pivotally connected to the upper portion of a vertical arm 56. The two actuating arms 52 and 54 are substantially paralleled to each other.

As shown in FIG. 5, when the hydraulic cylinder 34 is extended, it causes the lower actuating arm to rotate counterclockwise (through the linkage of bracket assembly 46 and the lower actuating shaft 48), which in turn causes the vertical arm 56 to move upwardly (the upper actuating arm 54 is also caused to rotate counterclockwise). It is this upward motion of the vertical arm 56 that moves the platform assembly 20 upwardly.

As shown in FIG. 6, when the hydraulic cylinder 34 is retracting, it causes the lower actuating arm to rotate clockwise (through the linkage of bracket assembly 46 and the lower actuating shaft 48), which in turn causes the vertical arm 56 to move downwardly. It is this downward motion of the vertical arm 56 that moves the platform assembly 20 downwardly.

The distance between the pivot points 48 and 50 can be substantially equal to the distance between the pivot points 58 and 60 to maintain the platform assembly 20 in horizontal orientation between its entry position (at vehicle floor level) and ground position (at outside vehicle ground level). However, it may be preferred to have unequal pivot distances to achieve a "ramp action" of the lift, i.e., the platform 20 would tilt upwardly when it reaches the entry level, and tilt downwardly when it reaches the ground level. In this way, the platform 20 is kept substantially horizontal when it is in the entry level even under a heavy loading weight, thereby making the lift safer for the user.

Figure 7:
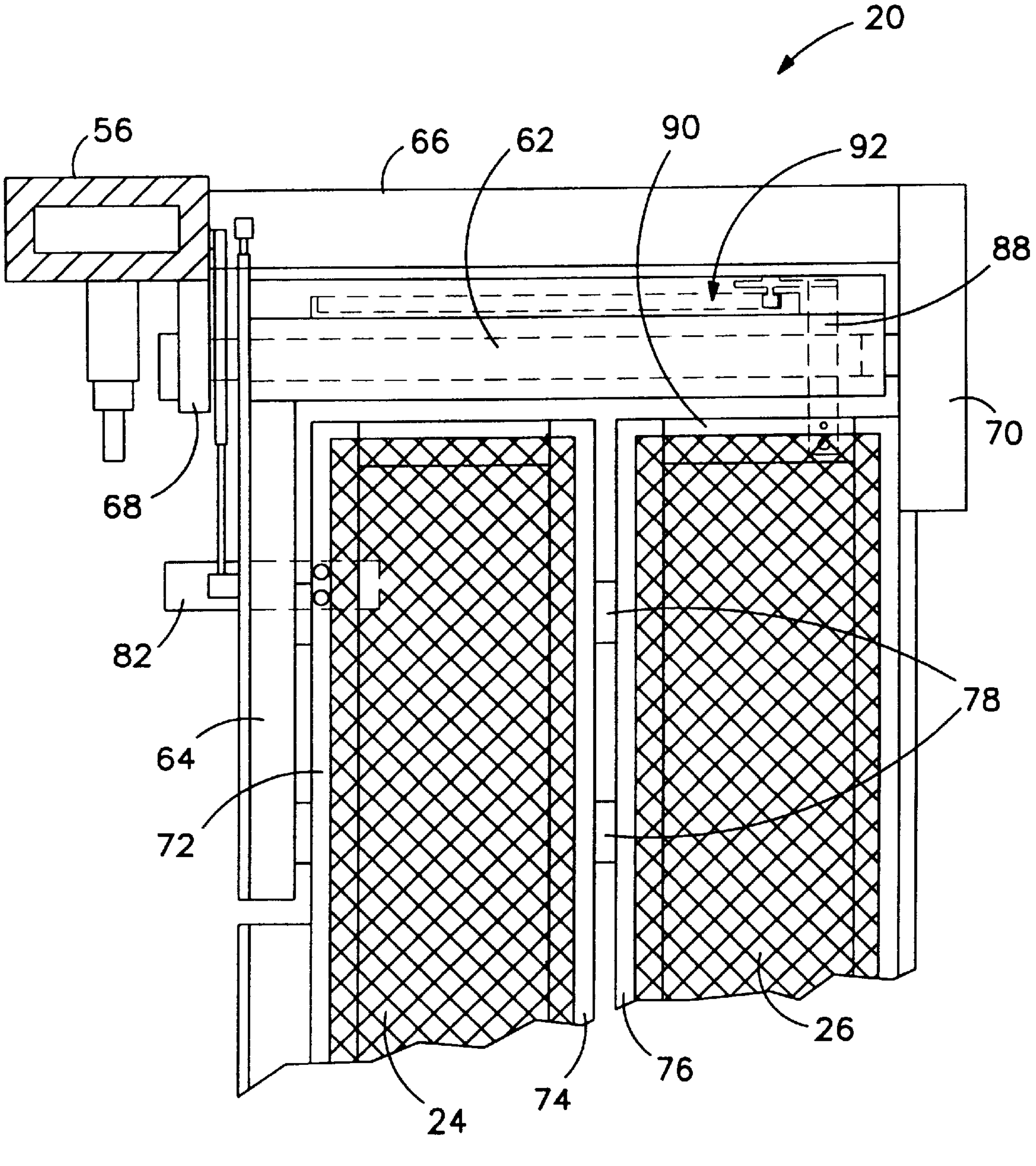
FIG. 7 is a partial top view of the platform with a mounting and an actuated mechanism for folding and unfolding thereof when the lift is between the entry and stow positions.

Referring to FIG. 7, the platform assembly 20 will be described in detail below. The platform assembly 20 has two main frame members 62 and 64 which are perpendicularly connected as an L-shaped configuration. The frame member 62 is pivotally mounted between two side supporting bars 68 and 70 which are fixedly connected to a horizontal lift beam 66 and extending toward the front of the platform 20, such that frame member 62 is parallel to the lift beam 66. The lift beam 66 is in turn perpendicularly connected to the vertical arm 56.

The platform assembly 20 also includes two separated plates 24 and 26. Plate 24 is pivotally mounted to frame member 64 at its distal edge 72. The two plates 24 and 26 are hingeably connected at their respective proximal edges 74 and 76 by means such as hinges 78.

Figure 9:
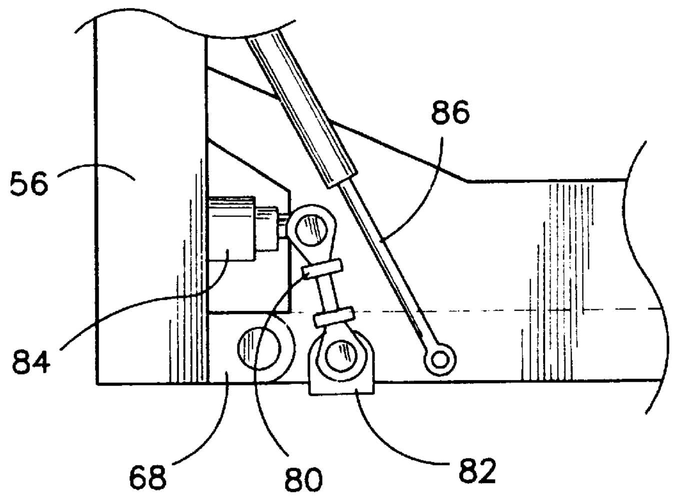
FIG. 9 is a side partial cutaway view of a linkage mechanism between the vertical arm and the platform.
Figure 10:
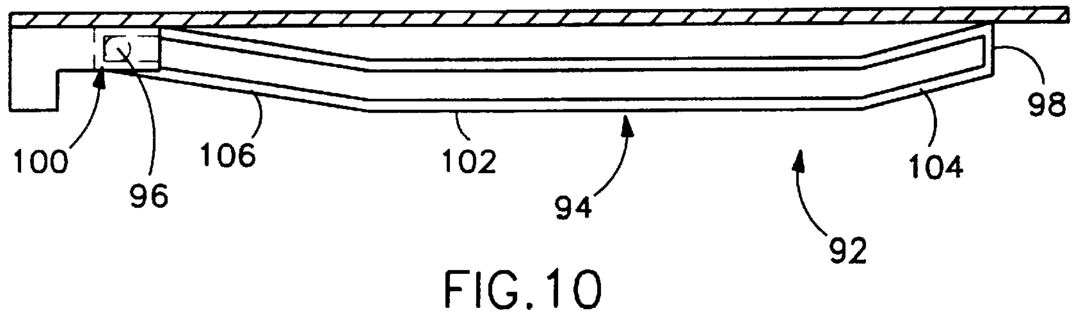
FIG. 10 is an enlarged rear view of the folding/unfolding guide structure of the platform as shown in the FIG. 11.
Figure 13:
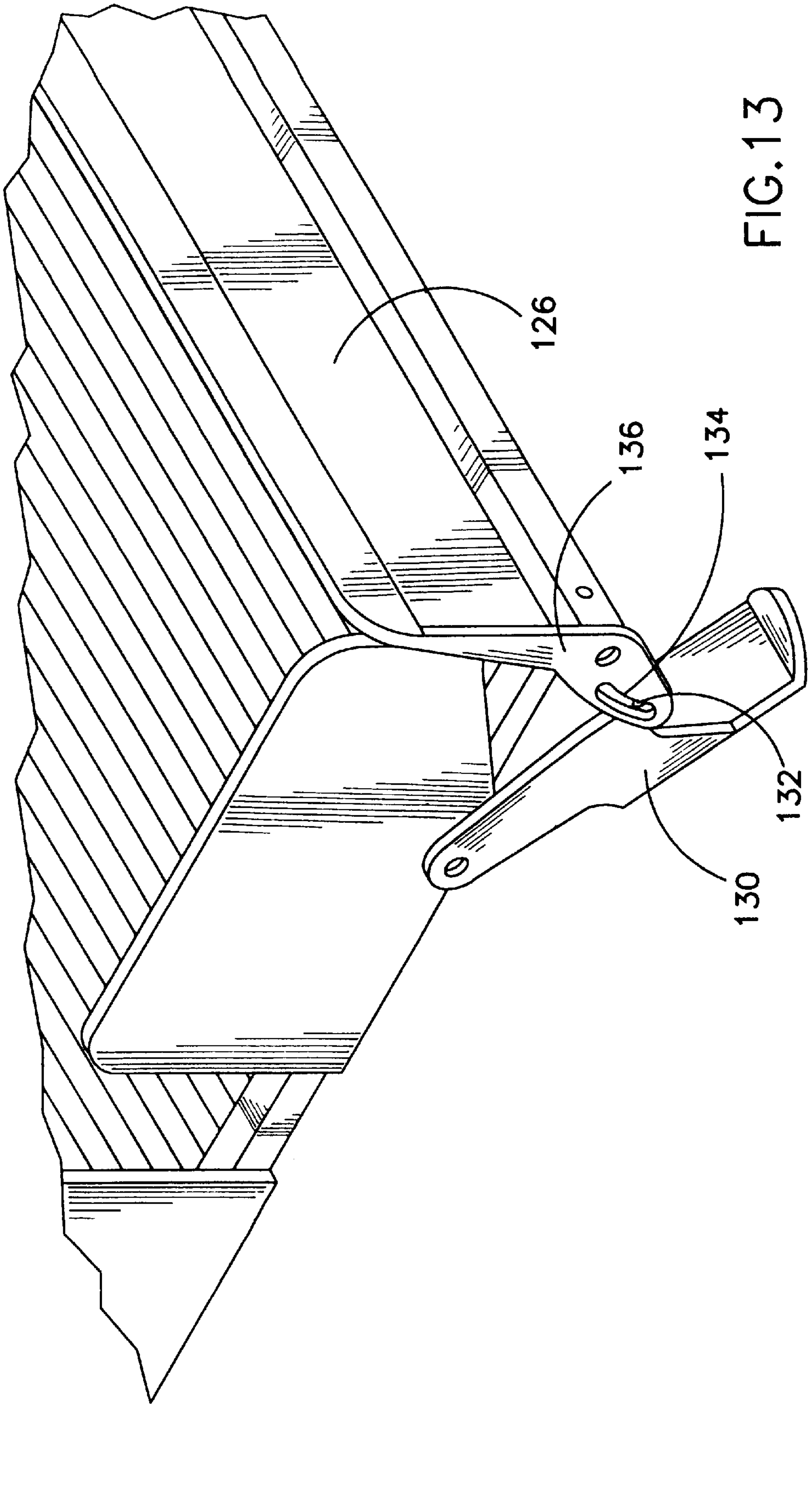
FIG. 13 is an enlarged partial isometric view of an outboard roll-stop structure of the platform in a closed position.
Figure 14:
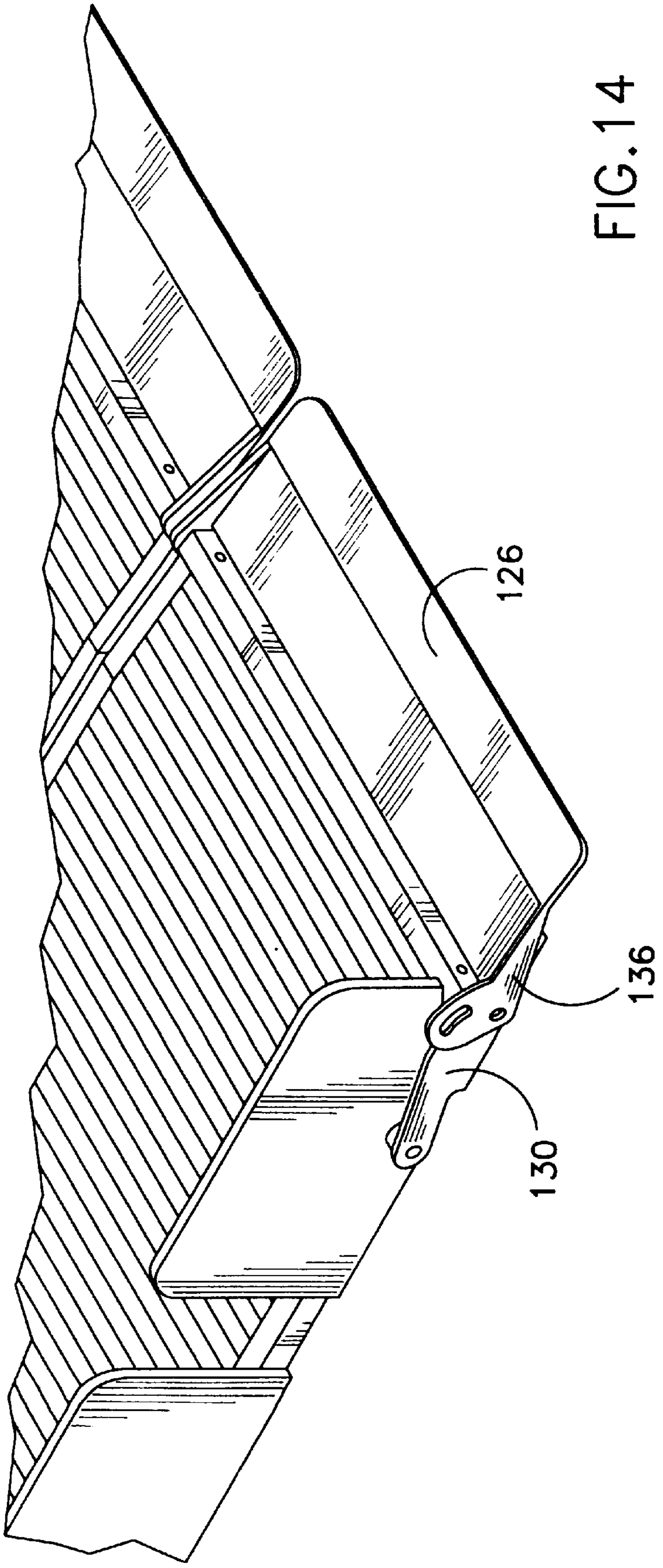
FIG. 14 is an enlarged partial isometric view of the outboard roll-stop structure as shown in FIG. 13 in an opened position.

Referring to FIGS. 5, 6 and 9, a ball-joint assembly 80 is connected between a linkage plate 82 which is mounted under the plate 24 and a stud 84 which extends out from the lower end of the vertical arm 56, for forcing the plate 24 to swing as the platform 20 is lifted up as shown in FIG. 5. A damping piston 86 may be connected between the platform 20 and the vertical arm 56 for cushioning the movement of the platform 20.

Referring to FIGS. 7, 8, 10, 11 and 12, a linkage bracket 88 is between the bottom edge 90 and a platform folding guide means 92. The platform folding guide means 92 includes a cam track 94 and a rolling wheel 96 which is slidable within the cam track 94. The cam track is mounted under frame member 62, such as it rotates together with the pivoted frame member 62. When the platform 20 is at the entry position, the cam track 94 faces to the rear of the wheelchair lift 10 (i.e., toward the interior of the vehicle) and the rolling wheel 96 is stopped at the distal closed end 100 of the cam track 94, which means that the platform 20 is fully unfolded to a horizontal position. When the platform is in the stowed position, the cam track 94 faces to the bottom of the wheelchair lift (i.e., towards the vehicle floor) and the rolling wheel 96 is stopped at the proximal closed end 98 of the cam track 94 and the platform 20 is fully folded to a vertical position next to the vertical arm 56.

An important feature of the cam track 96 is that it has a straight middle portion 102 and two opposite sloped end portions 104 and 106. These sloped end portions of the cam track 96 facilitate the smooth start and ending of the sliding movement of the rolling wheel 96, when the platform 20 begins unfolding from its fully folded position as well as when the platform begins folding from its fully deployed position.

Referring again to FIGS. 5 and 6, a handrail bar 108 and vertical bar 110 are utilized for the movements of the platform assembly 20 between its stowed position (vertical and folded) and its entry position (horizontal and unfolded). The vertical bar 110 is pivotally connected between the platform assembly 20 and the distal end 118 of the handrail bar 108. The proximal end 112 of the handrail bar 108 is pivotally connected to the vertical arm 56, and has an extended portion 114 supporting a roller wheel 116 which is engageable with the underneath side of lower actuating arm 52. By this mounting arrangement, the motions of the platform assembly 20 are well controller and especially prevent the platform assembly 20 from free falling or free deploying movement during all the lift motion. When the platform 20 is away from its entry position to the ground level position (as shown in FIG. 6), the roller wheel 116 is disengaged with the underneath side of lower actuating arm 52. As the platform 20 is lifted up from its entry level position towards its stowed position, the roller wheel 116 comes into contact with the lower actuating arm 52 which causes the handrail bar 108 to rotate counterclockwise, which causes the platform 20 to be raised through vertical bar 110. This provides an automatic stowing of the platform 20 with one hydraulic cylinder.

Figure 8:
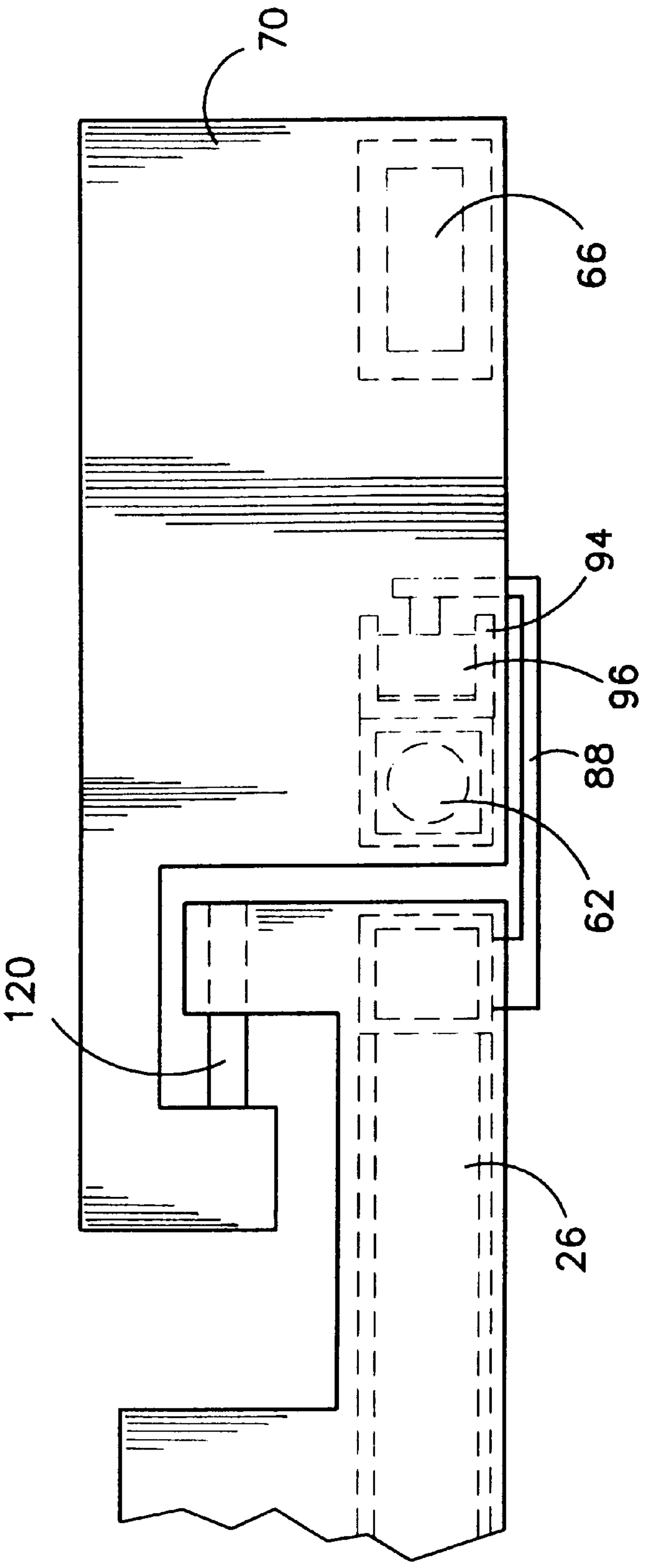
FIG. 8 is a partial side view of a folding/unfolding guide structure of the platform and an adjusting structure to the right side of the platform.

Referring to FIGS. 7 and 8, an adjusting screw 120 is also utilized for adjusting the plane level of the platform 20.

Referring to FIGS. 2, 3, 13 and 14, the platform assembly 20 also has two side panels 122 and 124 and a pair of outboard roll-stops 126 and 128. When the platform 20 is away from the ground level, the out-board roll-stops 126 and 128 are firmly closed. When the platform 20 has reached the ground level, the roll-stops 126 and 128 will automatically open to allow the wheelchair to exit to the ground level. This is achieved by utilizing ski bracket 130 with a pin stud 132 received in a cam groove 134 on a side bracket 136 of roll-stop 126. Ski bracket 130 is spring biased downwardly in the normal condition. When ski bracket 130 contacts the ground floor outside of the vehicle, it pivots upwardly which causes the roll-stop 126 to open (roll-stop 128 has a mirror image ski bracket arrangement).

The present invention wheelchair lift 10 has a unique motion pattern. From the stowed position to the entry level position, the lift 10 deploys from a vertical position to a horizontal position along with the unfolding movement of the platform 20 from a fully folded condition to a fully unfolded position. From the entry level position to the ground level position, the lift 10 moves downwardly along an arc path while the platform 20 keeps its unfolded and horizontal condition. When the lift 10 moves back from the ground level position to the stowed position, it goes through the reverse motions.

The present invention has many advantages. It provides full automatic control and operation of all motions of the wheelchair lift, including raising, lowering, folding and unfolding of the platform. In addition, it utilizes a single hydraulic power source which is powerful and provides a power up/gravity down hydraulic operation. Furthermore, the single-side-folding arrangement of the platform not only clears the doorway of the vehicle but also allows full reclining of the front passenger seat of the vehicle.

Defined in detail, the present invention is a wheelchair lift for use in conjunction with a vehicle having a door opening and a floor, the wheelchair lift comprising: (a) a mounting assembly mounted on the vehicle floor adjacent to the vehicle door opening; (b) a hydraulic actuating system contained within a housing which is attached to the mounting assembly and including a single hydraulic cylinder; (c) a foldable platform assembly rotatably connected to the mounting assembly and including two platform plates hingeably connected along their adjacent edges and further pivotally mounted to a platform frame member along a proximal edge of one of the two plates which is closer to the housing of the hydraulic actuating system; (d) a linking assembly connecting the hydraulic actuating system and the platform for automatically moving and rotating the platform assembly from a stow position inside the vehicle to an entry level position at the vehicle door opening and inversely, and moving the platform assembly between the entry level position and a ground level position outside the vehicle and inversely; and (e) means for facilitating the unfolding of the platform assembly as the platform assembly is moving from the stow position to the entry level position, and also the folding of the platform assembly as the platform assembly is moving from the entry level position to the stow position; (f) whereby the platform assembly can be automatically unfolded and deployed at the entry level position, and further moved to the ground level position in an unfolded condition, and inversely, and automatically folded and stowed at the stow position at one side of the vehicle door opening.

Defined broadly, the present invention is a wheelchair lift for use in conjunction with a vehicle having a door opening, the wheelchair lift comprising: (a) a single actuating mechanism; (b) a foldable platform assembly with two platform plates hingeably connected along their adjacent edges; and (c) a linking assembly connecting the single actuating mechanism and the platform assembly for automatically moving and rotating the platform assembly from a stow position inside the vehicle to an entry level position at the vehicle door opening and inversely, and moving the platform assembly between the entry level position and a ground level position outside the vehicle and inversely; (d) whereby the platform assembly can be automatically folded and stowed at one side of the vehicle door opening.

Defined more broadly, the present invention is a wheelchair lift for use in conjunction with a vehicle having a door opening and a floor, the wheelchair lift comprising a foldable platform assembly with two platform plates hingeably connected along their adjacent edges which are automatically foldable and stowed at one side of the vehicle door opening.

Of course the present invention is not intended to be restricted to any particular form or arrangement, or any specific embodiment disclosed herein, or any specific use, since the same may be modified in various particulars or relations without departing from the spirit or scope of the claimed invention herein above shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A wheelchair lift for use in conjunction with a vehicle having a door opening, the wheelchair lift comprising a foldable platform assembly with two platform plates hingeably connected together which are foldable and stowed at one side of the vehicle door opening, a single actuating mechanism for folding and unfolding and moving said platform assembly, a linking assembly connecting said single actuating mechanism and said platform assembly for moving and rotating said platform assembly from a stow position inside said vehicle to an entry level position at said vehicle door opening and inversely, and moving said platform assembly between the entry level position and a ground level position outside said vehicle and inversely, and means for facilitating the unfolding of said platform assembly as said platform assembly is moving from said stow position to said entry level position, and also the folding of said platform assembly as said platform assembly is moving from said entry level position to said stow position, wherein said means for facilitating the unfolding and folding of said platform assembly comprises a cam track for guiding the folding and unfolding of said two platform plates.

2. The wheelchair lift as defined in claim 1, wherein said cam track is pivotally mounted to a mounting assembly for following the rotation of said platform assembly between said entry level position and said stow position.

3. The wheelchair lift as defined in claim 1, wherein said cam track has a straight middle portion and two opposite sloped end portions for facilitating the smooth start and ending of the folding and unfolding of said two platform plates.

4. A wheelchair lift for use in conjunction with a vehicle having a door opening and a floor, the wheelchair lift comprising:

a. a single actuating mechanism;

b. a foldable platform assembly with two platform plates hingeably connected together along their adjacent edges;

c. a linking assembly connecting said single actuating mechanism and said platform assembly for moving and rotating said platform assembly from a stow position inside said vehicle to an entry level position at said vehicle door opening and inversely, and moving said platform assembly between the entry level position and a ground level position outside said vehicle and inversely;

d. means for facilitating the unfolding of said platform assembly as said platform assembly is moving from said stow position to said entry level position, and also the folding of said platform assembly as said platform assembly is moving from said entry level position to said stow position; and e. said means for facilitating the unfolding and folding of said platform assembly comprises a cam track for guiding the folding and unfolding of said two platform plates;

f. whereby said platform assembly can be automatically folded and stowed at one side of said vehicle door opening.

5. The wheelchair lift as defined in claim 4, wherein said single actuating mechanism comprises a hydraulic cylinder.

6. The wheelchair lift as defined in claim 4, wherein said cam track is pivotally mounted to a mounting assembly for following the rotation of said platform assembly between said entry level position and said stow position.

7. The wheelchair lift as defined in claim 4, wherein said cam track has a straight middle portion and two opposite sloped end portions for facilitating the smooth start and ending of the folding and unfolding of said two platform plates.

8. A wheelchair lift for use in conjunction with a vehicle having a door opening and a floor, the wheelchair lift comprising:

a. a mounting assembly mountable on said vehicle floor adjacent to said vehicle door opening;

b. a hydraulic actuating system contained within a housing which is attached to said mounting assembly and including a single hydraulic cylinder;

c. a foldable platform assembly rotatably connected to said mounting assembly and including two platform plates hingeably connected together along their adjacent edges and further pivotally mounted to a platform frame member along a proximal edge of one of the two plates which is closer to said housing of said hydraulic actuating system;

d. a linking assembly connecting said hydraulic actuating system and said platform assembly for moving and rotating said platform assembly from a stow position inside said vehicle to an entry level position at said vehicle door opening and inversely, and moving said platform assembly between the entry level position and a ground level position outside said vehicle and inversely;

e. means for facilitating the unfolding of said platform assembly as said platform assembly is moving from said stow position to said entry level position, and also the folding of said platform assembly as said platform assembly is moving from said entry level position to said stow position; and f. said means for facilitating the unfolding and folding of said platform assembly comprises a cam track for guiding the movement of a lower distal corner of the other one of said two plates which is remote from said housing of said hydraulic actuating system;

g. whereby said platform assembly can be automatically unfolded and deployed at said entry level position, and further moved to said ground level position in an unfolded condition, and inversely, and automatically folded and stowed at said stow position at one side of said vehicle door opening.

9. The wheelchair lift as defined in claim 8, wherein said linking assembly comprises at least one actuating arm connected to said hydraulic actuating assembly for moving said platform assembly.

10. The wheelchair lift as defined in claim 9, wherein said linking assembly comprises means connected to said platform assembly and engageable with said at least one actuating arm when said platform assembly is moving between said entry level position and said stow position for rotating said platform assembly from a primarily horizontal orientation at said entry level position to a primarily vertical orientation at said stow position and inversely, but disengaged with said actuating arm when said platform assembly is moving between said entry level position and said ground level position for maintaining said platform assembly in the primarily horizontal orientation.

11. The wheelchair lift as defined in claim 8, wherein said means for facilitating the unfolding and folding of said platform assembly comprises a ball-joint assembly connected between said linking assembly and said one of said two plates which is closer to said housing of said hydraulic assembly.

12. The wheelchair lift as defined in claim 8, wherein means for facilitating the unfolding and folding of said platform assembly further comprises a sliding member slidably received within said cam track and connected to said lower distal corner of said other one of said two plates.

13. The wheelchair lift as defined in claim 8, wherein said cam track is pivotally mounted in parallel to said mounting assembly for following the rotation of said platform assembly between said entry level position and said stow position.

14. The wheelchair lift as defined in claim 8, wherein said cam track has a straight middle portion and two opposite sloped end portions for facilitating the smooth start and ending of the movement of said lower distal corner of said other one of said two plates.

15. The wheelchair lift as defined in claim 8 further comprising means for preventing a wheelchair from rolling-off said platform assembly before said platform assembly reaches said ground level position.

16. The wheelchair lift as defined in claim 15 further comprising a self-engaged mechanism for opening said means for preventing said wheelchair from rolling-off said platform assembly, when said platform assembly reaches said ground level position.

* * * * *